(12) United States Patent
Brockmann et al.

(10) Patent No.: US 6,695,354 B2
(45) Date of Patent: Feb. 24, 2004

(54) TUBE ARRANGEMENT

(75) Inventors: Hermann Brockmann, Buchholz (DE); Karsten Küddelsmann, Hamburg (DE); Wolfgang Papenfuss, Hamburg (DE); Manfred Seeck, Hamburg (DE)

(73) Assignee: Phoenix AG, Hamburg (DE)

( * ) Notice: Subject to any disclaimer, the term of this patent is extended or adjusted under 35 U.S.C. 154(b) by 17 days.

(21) Appl. No.: 10/069,864

(22) PCT Filed: Jun. 12, 2001

(86) PCT No.: PCT/DE01/02175
§ 371 (c)(1),
(2), (4) Date: Feb. 26, 2002

(87) PCT Pub. No.: WO02/01106
PCT Pub. Date: Jan. 3, 2002

(65) Prior Publication Data
US 2003/0071458 A1 Apr. 17, 2003

(30) Foreign Application Priority Data
Jun. 27, 2000 (DE) .......................... 100 30 355

(51) Int. Cl.[7] .................................... F16L 47/00
(52) U.S. Cl. ..................... 285/23; 285/252; 285/242
(58) Field of Search ................ 285/23, 252, 253, 285/379, 254, 242

(56) References Cited
U.S. PATENT DOCUMENTS

| | | | | |
|---|---|---|---|---|
| 709,799 A | * | 9/1902 | Kidd et al. | 427/444 |
| 3,389,442 A | * | 6/1968 | Tetzlaff | 285/252 |
| 5,234,233 A | | 8/1993 | Fix | |
| 5,388,872 A | * | 2/1995 | Campo et al. | 285/253 |
| 5,622,391 A | * | 4/1997 | Belik | 285/23 |
| 5,675,871 A | | 10/1997 | Webb et al. | |
| 5,749,603 A | * | 5/1998 | Mann | 285/23 |
| 6,343,772 B1 | * | 2/2002 | Oi | 285/23 |
| 6,390,136 B1 | * | 5/2002 | Hutchins et al. | 285/252 |

FOREIGN PATENT DOCUMENTS

| | | |
|---|---|---|
| DE | 33 36 940 | 3/1986 |
| DE | 195 33 553 | 3/1997 |
| EP | 0 367 136 | 10/1989 |
| EP | 0 593 852 | 4/1994 |
| FR | 2 630 808 | 11/1989 |
| WO | WO98/19096 | 5/1998 |

* cited by examiner

Primary Examiner—Lynne H. Browne
Assistant Examiner—David Bochna
(74) Attorney, Agent, or Firm—Collard & Roe, P.C.

(57) ABSTRACT

A tube arrangement, comprising a tube made of a polymer material which is provided with an embedded reinforcement. At least one tube end is slid onto a short metal or plastic pipe. A pipe clamp, especially a screw pipe clamp, secures the tube end onto the pipe. A retaining sleeve on the tube end secures the pipe clamp to the tube. This retaining sleeve is made of a polymer material and comprises a one piece molded part which is pushed onto the tube end. The retaining sleeve comprises the following components: a retainer ring with an inner diameter which is positioned over the outer diameter of the tube end; a clamp receiving element in the form of at least two axially extending retaining elements which are connected to the retainer ring at one end; a retaining collar at the other end of each retaining element; and a collar ring with an inside diameter connecting the retaining collars.

29 Claims, 3 Drawing Sheets

TUBE ARRANGEMENT

CROSS REFERENCE TO RELATED APPLICATIONS

Applicants claim priority under 35 U.S.C. §119 of German Application No. 100 30 335.8 filed Jun. 27, 2000. Applicants also claim priority under 35 U.S.C. §120 of PCT/DE01/02175 filed Jun. 12, 2001. The international application under PCT article 21(2) was not published in English.

BACKGROUND OF THE INVENTION

The invention relates to a tube arrangement that comprises a tube made of a polymer material. In particular, said tube is provided with an embedded reinforcement, whereby at least one end of the tube is pushed over a short connection pipe made of metal or plastic, and whereby the end of the tube is pressed onto the short connection pipe by a pipe clamp, in particular by a screw clamp.

A tube arrangement of the present type is widely employed especially in the field of motor vehicle building. The short pipe may be a part of an aggregate (cylinder head, water pump, cooler etc.). A short motor vehicle aggregate pipe is described, for example in published patent document EP 0 367 136 B1.

A short pipe may be also a T-shaped structural part on which three tube segments are mounted. Reference is made in this regard to published patent document DE 33 36 940 C2.

However, no solution has been available to this date in connection with which pipe clamps, in particular screw clamps can be mounted in the opened condition on the end of the tube in a manner securing it in its position and against rotation.

Now, the problem of the invention against the background of said problems is to pre-mount the opened pipe clamp on the end of the hose in a defined manner and in a way it cannot be lost; to assure the clamp is installed in such a way that is secured against rotation; as well as to simplify the installation of the clamp in places that are difficult to access. Furthermore, the aim is that the installation of the clamp is not depending on any structural part.

SUMMARY OF THE INVENTION

The problem is solved in that the end of the tube is provided with a retaining sleeve made of polymer material and mounted on said end, whereby the retaining sleeve comprises within the framework of a single-piece molded part the following structural components:

A retainer ring with an inside diameter D1 that grips around the end of the hose with an outside diameter D;

an element for receiving the clamp in the form of two axially extending retaining elements, which each are connected with the retainer ring via one of their ends; as well as a retaining sleeve located at the other end of each retaining element.

Useful further developments of the tube arrangement as defined by the invention are also specified below.

BRIEF DESCRIPTION OF THE DRAWINGS

Now, the invention is explained in greater detail in the following with the help of exemplified embodiments and by reference to schematic drawings, in which.

DETAILED DESCRIPTION OF THE INVENTION

Figure 1:
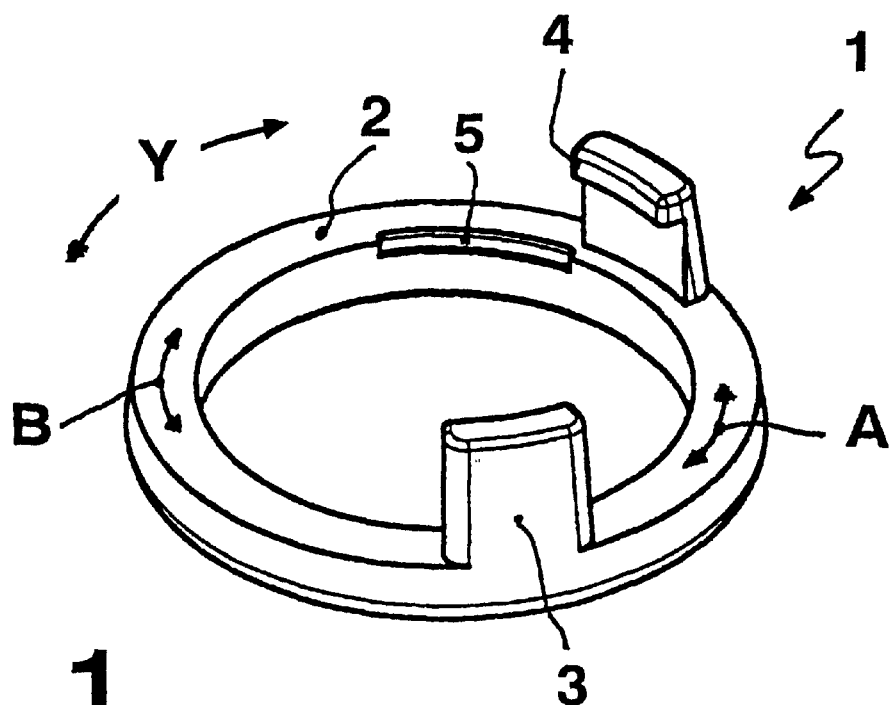
FIG. 1 shows a retaining sleeve with two retaining elements.

FIG. 1 shows a retaining sleeve 1 that comprises a retaining ring 2 as well as two axially extending retaining elements 3 of the same width, which in turn each are provided with a retaining collar 4. The retaining elements are arranged in this connection in such a way that a small spacing A, on the one hand, and a large spacing B on the other are formed in the peripheral direction Y of the retainer ring between the two retaining elements. The large spacing B preferably amounts to two to three times the small spacing A.

Figure 2:
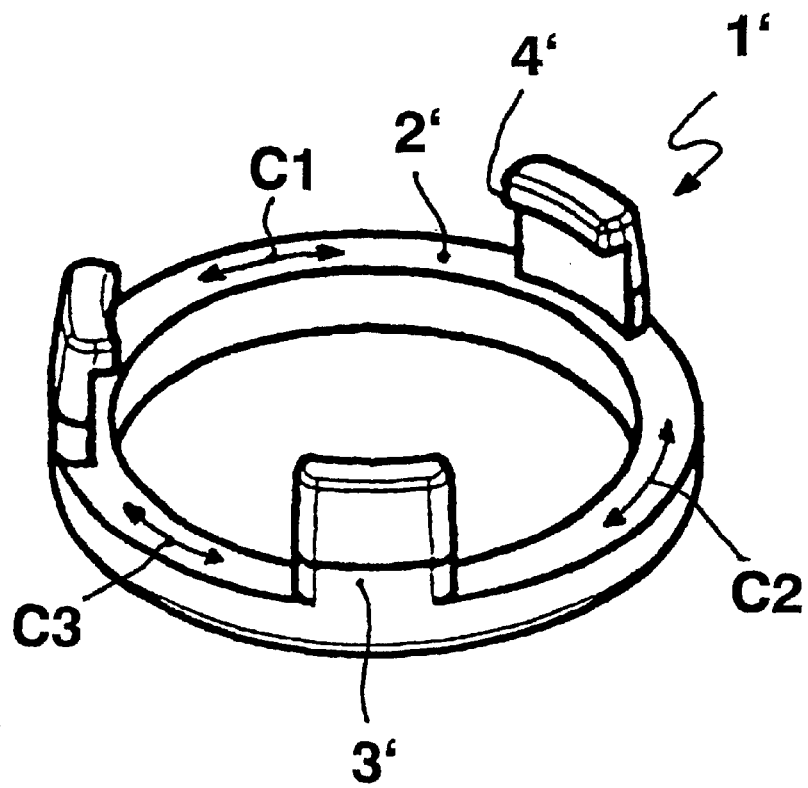
FIG. 2 shows a retaining sleeve with three retaining elements.

According to FIG. 2, the retaining sleeve 1' comprises a retaining ring 2', whereby three retaining elements 3' of the same width are provided in the present case, which in turn each are provided with a retaining collar 4'. The three retaining elements are arranged in the circumferential direction Y of the retainer ring in such a way that at least the two spacings C1 and C2 are the same. In particular, the following spacing variations are used in this connection:

$(C1=C2)>C3$ $C1=C2=C3$.

Figure 3:
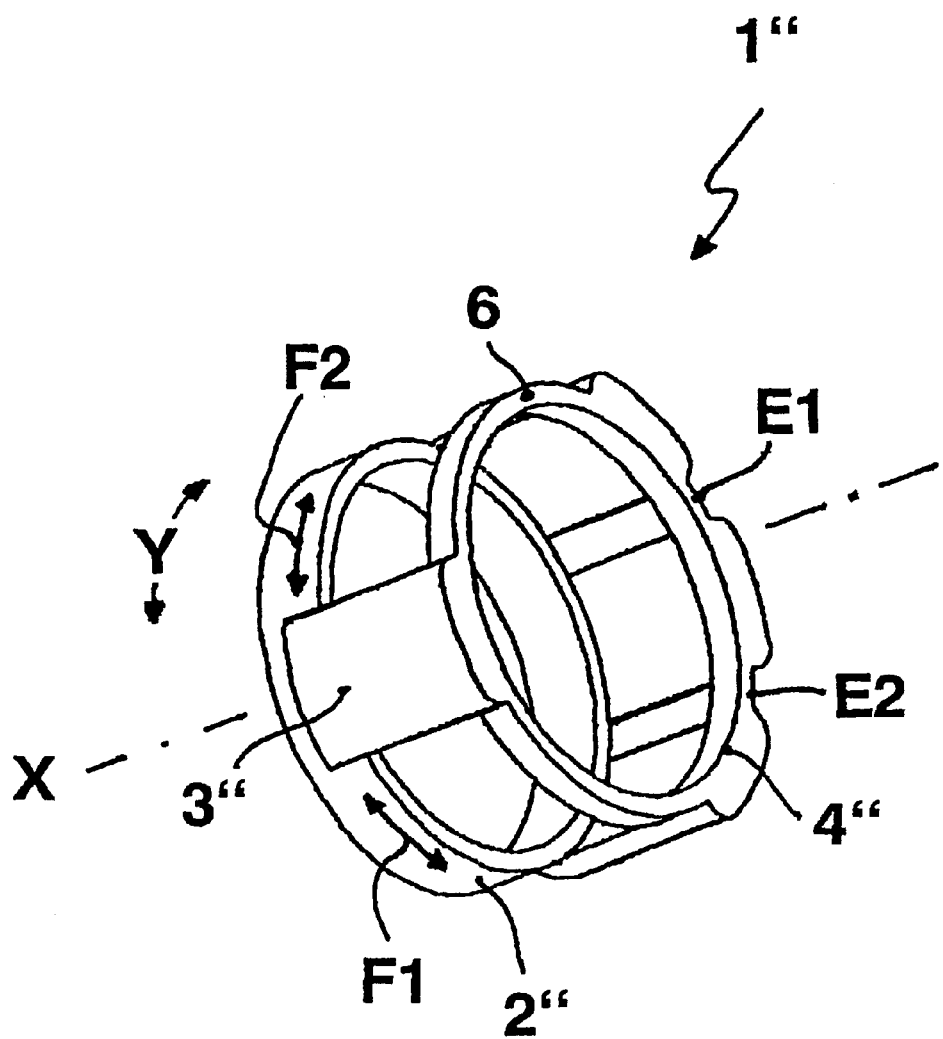
FIG. 3 shows a retaining sleeve with four retaining elements and a collar ring.

Now, FIG. 3 shows a retaining sleeve 1" with a retainer ring 2" and a total of four of the retaining elements 3". Said retaining elements are arranged in such a way that in the circumferential direction Y of the retainer ring, the two small spacings E1, E2 within a group of three retaining elements, on the one hand, and between the two outer retaining elements of said group and the fourth retaining element with the two large spacings F1, F2, on the other hand, are formed, whereby the two small spacings E1, E2 and the two large spacings F1, F2 each are constant among each other. The large spacings F1, F2 preferably amount to five to six times the small spacings E1, E2.

While in the exemplified embodiments according to FIGS. 1 and 2, the individual retaining collars 4 and 41 are separated from each other in the circumferential direction Y of the retainer rings 2 and 2', respectively, whereby the width of a retaining collar corresponds with about the width of the respective retaining element, in the exemplified embodiment according to FIG. 3, the individual retaining, collars 4" are connected with each other in the circumferential direction Y, notably with formation of a retaining collar ring 6, which can be referred to also as the second retainer ring. In the axial direction X, the retainer ring 2" is wider than the collar ring 6.

Figure 5:
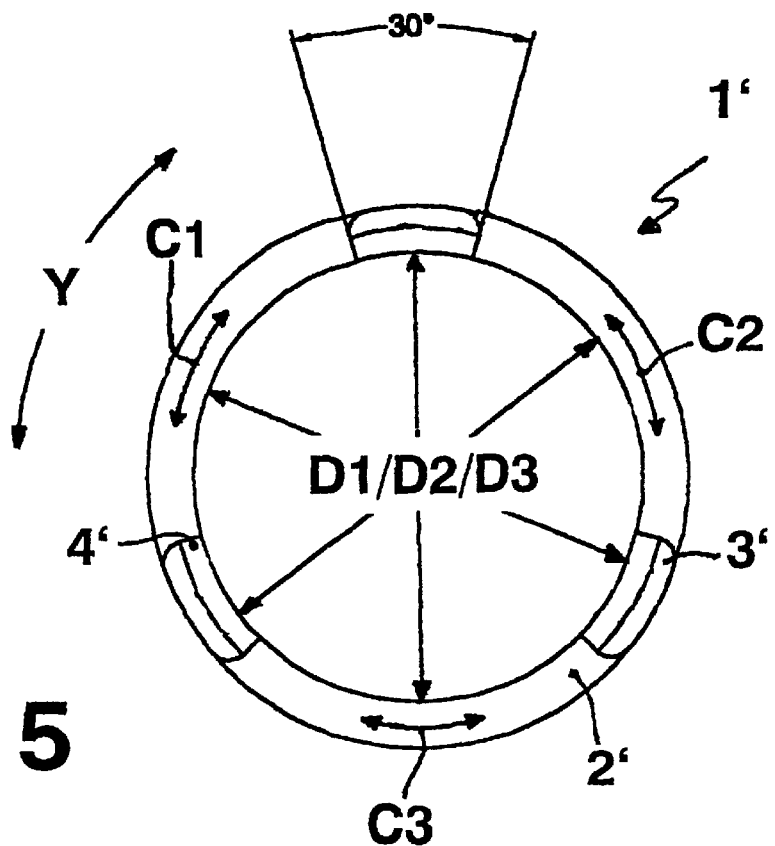
FIG. 5 shows the diameter constellation of a retaining sleeve according to FIG. 2.

In the exemplified embodiments according to FIGS. 1 to 3, the width of each retaining element in the circumferential direction Y amounts to about 30°, whereby, furthermore, reference is made to FIG. 5 in this regard.

Now, with respect to the exemplified embodiment according to FIG. 2 (spacing variation: $C11=C2=C3$), constructional details of the tube arrangement and the retaining sleeve are described in the following.

Figure 4:
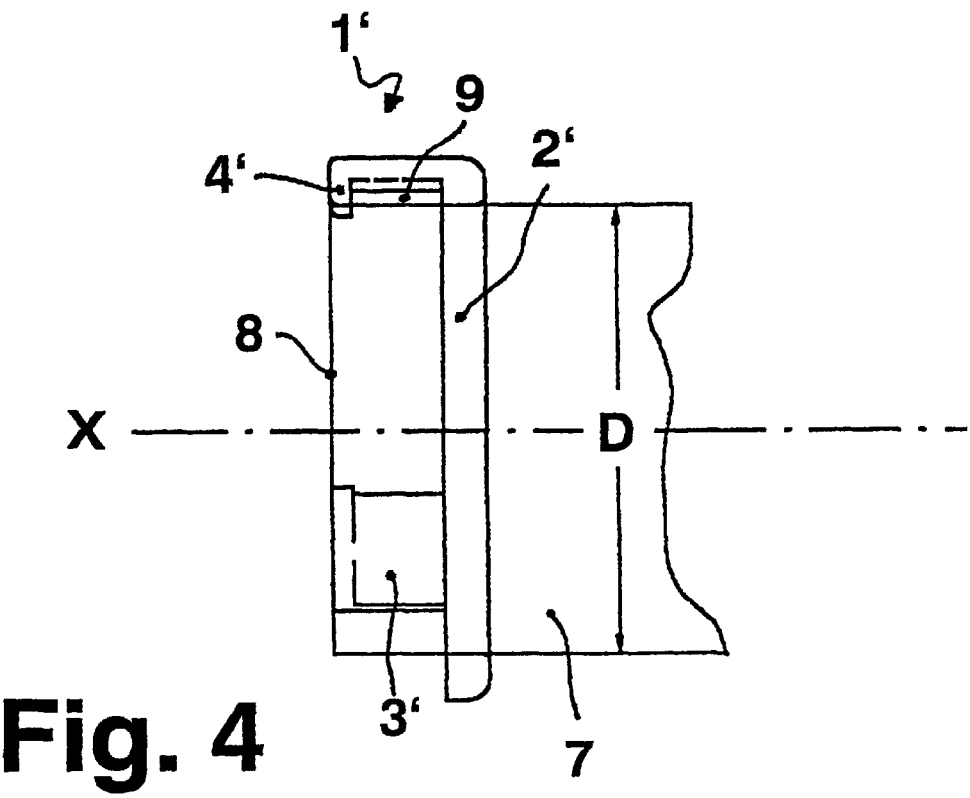
FIG. 4 shows a tube arrangement comprising a retaining sleeve according to FIG. 2.

According to FIG. 4, the retaining sleeve 1' with the retainer ring 2' and the retaining elements 3' extending in the axial direction X is mounted on the tube end 7 with an outside diameter D, whereby the retaining collar 4' is facing the face side 8 of the tube end. The retaining collars serve for elastically supporting the pipe clamps. The clamp, in particular the screw clamp is located within the receiving space 9 (not shown here).

Now, FIG. 5 shows again the retaining sleeve 1' within the framework of a radial sectional representation. In this connection, the retainer ring 2' has an inside diameter D1. The retaining collars 4' of the total of the three retaining elements 3' are constructed in such a way that ring segments with a formal inside diameter D2 are formed.

Now, referring to the exemplified embodiment according to FIG. 2, if the individual retaining collars 4' are connected with each other in the circumferential direction Y of the retaining ring 2', a collar ring with an inside diameter D3 is formed.

The inside diameters D1, D2 and D3 are preferably the same. Furthermore, it is useful if the inside diameter D1 of the retaining ring is smaller than the outside diameter D of the end of the tube, notably with formation of an initially tensioned retaining sleeve, whereby the initial tension amounts to about 5 to 10%. In this way, pre-mounting is assured to be particularly secured against loss of the sleeve.

Furthermore, it is advantageous if the tube or the end of the tube and the retaining sleeve are made of an elastomer or a thermoplastic elastomer (abbreviated designation: TPE). The retaining sleeve has in this connection a higher Shore hardness than the tube or end of the tube.

In conjunction with said material-specific properties, the end of the tube can be easily pushed over the short pipe even if the retaining sleeve is initially tensioned. The short pipe may be provided with a supporting bead, if need Furthermore, in the visible area, the retaining sleeve may have an installation and mounting marking preferably in the form of a color marking or embossing, whereby reference is made by way of example to the marking 5 in the zone of the retainer ring 2 according to FIG. 1.

Moreover, the retaining sleeve and/or the pipe clamp may additionally have adhesive points.

The retaining sleeve contains a solution that is independent of the structural component because it can be mounted on all tube ends having the same diameter. This is a solution that is favorable in cost as well.

Furthermore, the clamp can be pre-installed on the retaining sleeve with a different opening measure because adequate space is available in the peripheral direction Y between the individual retaining elements.

List of Reference Symbols 1, 1', 1" Retaining sleeve
2, 2', 2" Retainer ring
3, 3', 3" Retaining element
4, 4', 4" Retaining collar
5 Installation and mounting marking
6 Collar ring
7 End of tube
8 Face side of end of tube
9 Space for receiving the pipe clamp
D Outside diameter of end of tube
D1 Inside diameter of retainer ring
D2 Formal inside diameter of collar ring segments
D3 Inside diameter of collar ring
A, B Spacings between two retaining elements
C1, C2, C3 Spacings between three retaining elements
E1, E2, F1, F2 Spacings between four retaining elements
X Axial direction
Y Circumferential direction of retainer ring

What is claimed is:

1. A retaining sleeve, made of a polymer based single piece molded part, for securing a pipe clamp, which secures a tube to a pipe, the retaining sleeve comprising:
    (a) at least one retainer ring having an inside surface with an inside diameter which can be positioned over the tube having an outside surface with an outside diameter;
    (b) a plurality of retaining elements extending axially from said at least one retainer ring;
    (c) a retaining collar disposed on each of said plurality of retaining elements at an end of said plurality of retaining elements not attached to said at least one retainer ring; and
    (d) at least one collar ring having an inside surface with an inside diameter, wherein said at least one collar ring connects to all of said retaining collars in a circumferential direction of said at least one retainer ring.

2. The retaining sleeve according to claim 1, wherein the pipe clamp is a screw pipe clamp.

3. The retaining sleeve according to claim 1, wherein the tube is formed with an embedded reinforcement.

4. The retaining sleeve according to claim 1, wherein said plurality of retaining elements is at least two retaining elements but at most four retaining elements.

5. The retaining sleeve according to claim 1, wherein said plurality of retaining elements comprises two retaining elements, which are adapted to form a first relatively smaller spacing and a second relatively larger spacing between said two retaining elements in a circumferential direction of said at least one retainer ring.

6. The retaining sleeve according to claim 5, wherein said relatively larger spacing is at least two times a size of said relatively smaller spacing.

7. The retaining sleeve according to claim 1, wherein said plurality of retaining elements comprises three retaining elements, which are adapted to form at least two equal spacings between said three retaining elements in a circumferential direction of said at least one retainer ring, and a third spacing between two of said three retaining elements in a circumferential direction of said at least one retainer ring, wherein said at least two equal spacings are equal to or greater than said third spacing.

8. The retaining sleeve according to claim 1, wherein said plurality of retaining elements comprises four retaining elements, which are adapted to form two relatively smaller spacings among a group of three of said four retaining elements in a circumferential direction of said at least one retainer ring, and two relatively larger spacings between two outer retaining elements of said group of three of said four retaining elements and a fourth retaining element in a circumferential direction of said at least one retainer ring, wherein said two relatively smaller spacings are equal to one another and said two relatively larger spacings are equal to one another.

9. The retaining sleeve according to claim 8, wherein said two relatively larger spacings are three to seven times a distance of said two relatively smaller spacings.

10. The retaining sleeve according to claim 8, wherein said two relatively larger spacings are five to six times a distance of said two relatively smaller spacings.

11. The retaining Sleeve according to claim 1, wherein a width of each of said plurality of retaining elements in a circumferential direction of said at least one retainer ring is the same.

12. The retaining sleeve according to claim 1, wherein a width of each of said, plurality of retaining collars in a circumferential direction of said at least one retainer ring is approximately equal to a width of each of said plurality of retaining elements on which said plurality of retaining collars is disposed, in a circumferential direction of said at least one retainer ring.

13. The retaining sleeve according to claim 1, wherein said plurality of retaining collars form a plurality of ring segments with an inside diameter.

14. The retaining sleeve according to claim 13, wherein said inside diameter of said plurality of ring segments is approximately equal to said inside diameter of said at least one retainer ring.

15. The retaining sleeve according to claim 1, wherein said inside diameter of said at least one collar ring is approximately equal to said inside diameter of said at least one retainer ring.

16. The retaining sleeve according to claim 1, wherein said at least one retainer ring is wider than said at least one collar ring in an axial direction.

17. The retaining sleeve according to claim 1, wherein said inside diameter of said at least one retainer ring is smaller than the outside diameter of the at least one end of the tube.

18. The retaining sleeve according to claim 1, wherein said plurality of retaining collars and said at least one collar ring face a face side of the at least one end of the tube.

19. The retaining sleeve according to claim 1, wherein the tube, the at least one end of the tube, and the retaining sleeve are made of an elastomer material.

20. The retaining sleeve according to claim 1, wherein the tube, the at least one end off the tube, and the retaining sleeve are made of a thermoplastic elastomer material.

21. The retaining sleeve according to claim 1, wherein the retaining sleeve has a higher Shore hardness than the tube and the at least one end of the tube.

22. The retaining sleeve according to claim 1, further comprising an installation and mounting marking disposed on the retaining sleeve in a visible area.

23. The retaining sleeve according to claim 22, wherein said installation and mounting marking comprises a color marking.

24. The retaining sleeve according to claim 22, wherein said installation and mounting marking comprises an embossing.

25. The retaining sleeve according to claim 22, wherein said installation and mounting marking is disposed on said at least one retainer ring.

26. The retaining sleeve according to claim 22, wherein said installation and mounting marking is disposed on at least one of said plurality of retaining elements.

27. The retaining sleeve according to claim 1, wherein the retaining sleeve has a plurality of adhesive points.

28. The retaining sleeve according to claim 1, wherein the pipe clamp has a plurality of adhesive points.

29. A tube arrangement including a tube made of polymer material having at least one end with an outside surface having an outside diameter, wherein the tube is pushed over a short pipe made of metal or plastic and secured to the short pipe with a pipe clamp, and a retaining sleeve made of a polymer based single piece molded part, which is pushed on to the at least one end of the tube with the outside diameter and secures the pipe clamp to the tube, the retaining sleeve comprising:

(a) at least one retainer ring having an inside surface with an inside diameter which can be positioned over the tube having the outside surface with the outside diameter (b) a plurality of retaining elements extending axially from said at least one retainer ring;

(c) a disposed collar disposed on each of said plurality of retaining elements at an end of said plurality of retaining elements not attached to said at least one retainer ring; and (d) at least one collar ring having an inside surface with an inside diameter, wherein said at least one collar ring connects to all of said retaining collars in a circumferential direction of said at least one retainer ring.

* * * * *

UNITED STATES PATENT AND TRADEMARK OFFICE
CERTIFICATE OF CORRECTION

PATENT NO. : 6,695,354 B2
DATED : February 24, 2004
INVENTOR(S) : Brockmann et al.

It is certified that error appears in the above-identified patent and that said Letters Patent is hereby corrected as shown below:

Column 4,
Line 64, after the word "retaining" please change "Sleeve" to -- sleeve --.

Column 5,
Line 33, after the word "end" please change "off" to -- of --.

Column 6,
Line 31, after the word "a" please change "disposed" to -- retaining --.

Signed and Sealed this

Ninth Day of November, 2004

JON W. DUDAS
*Director of the United States Patent and Trademark Office*